Sept. 13, 1932.   R. E. MILLER   1,877,682
AUTOMATIC BOTTLE WASHING AND BRUSHING MACHINE
Filed April 18, 1929   9 Sheets-Sheet 1
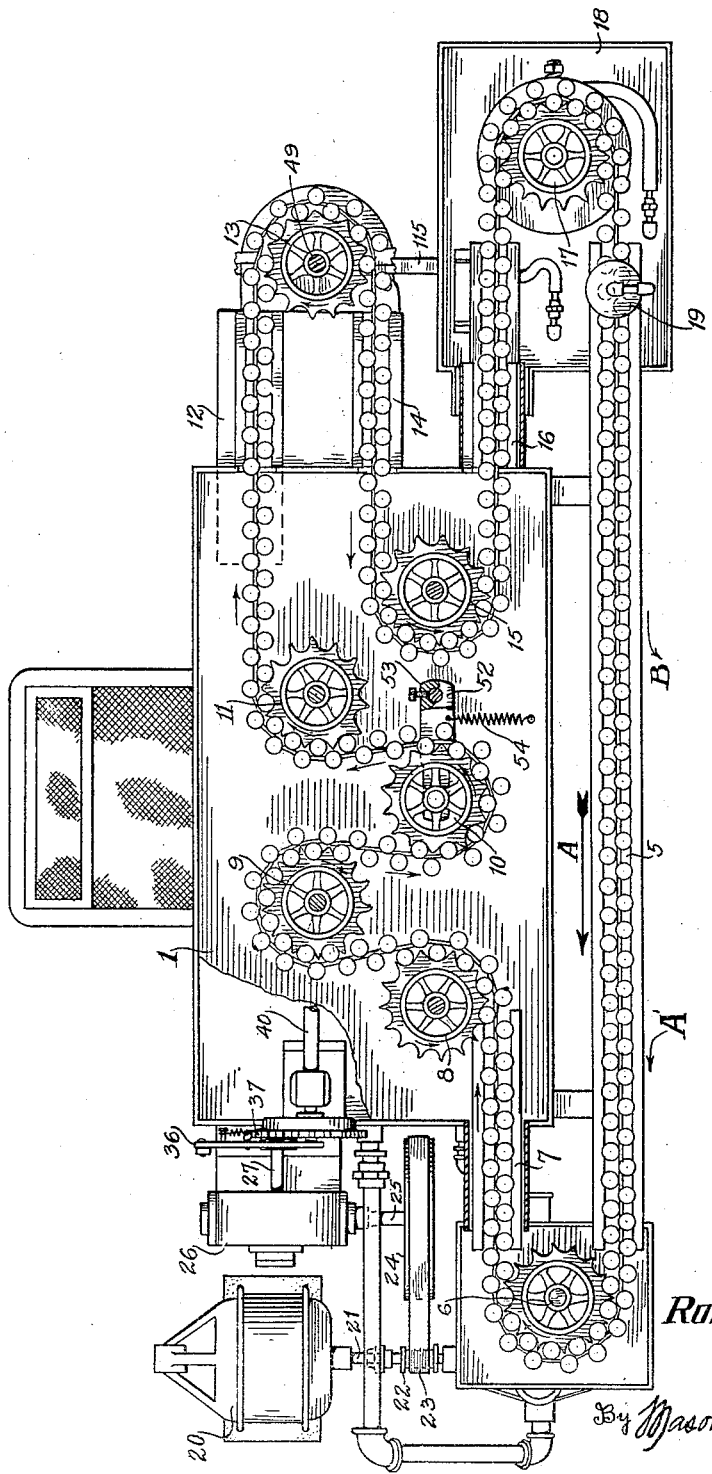
Inventor
Robert E. Miller
By Mason Fenwick Lawrence
Attorneys

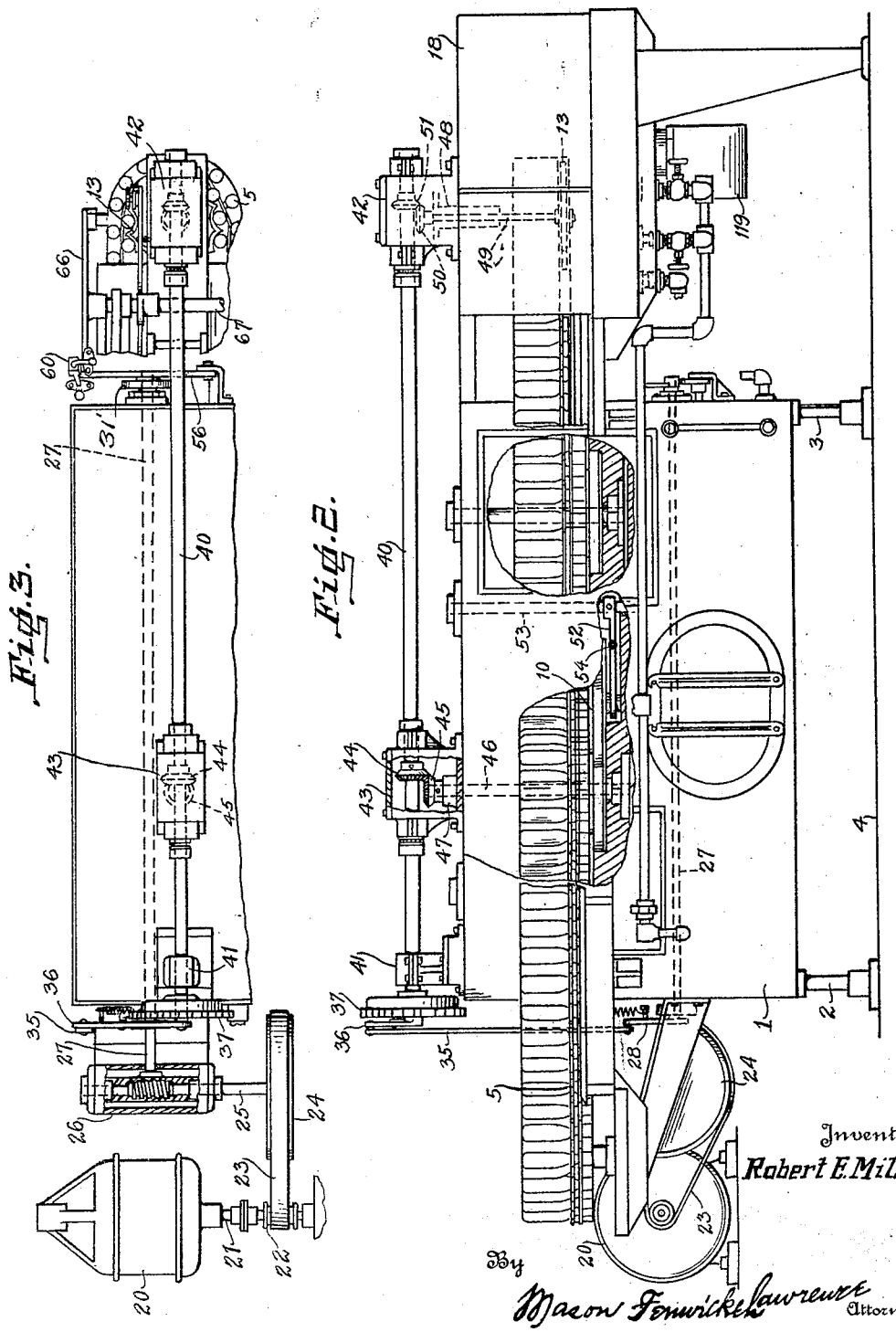

Sept. 13, 1932. R. E. MILLER 1,877,682
AUTOMATIC BOTTLE WASHING AND BRUSHING MACHINE
Filed April 18, 1929 9 Sheets-Sheet 3

Inventor
Robert E. Miller
By Mason Fenwick&Lawrence
Attorneys

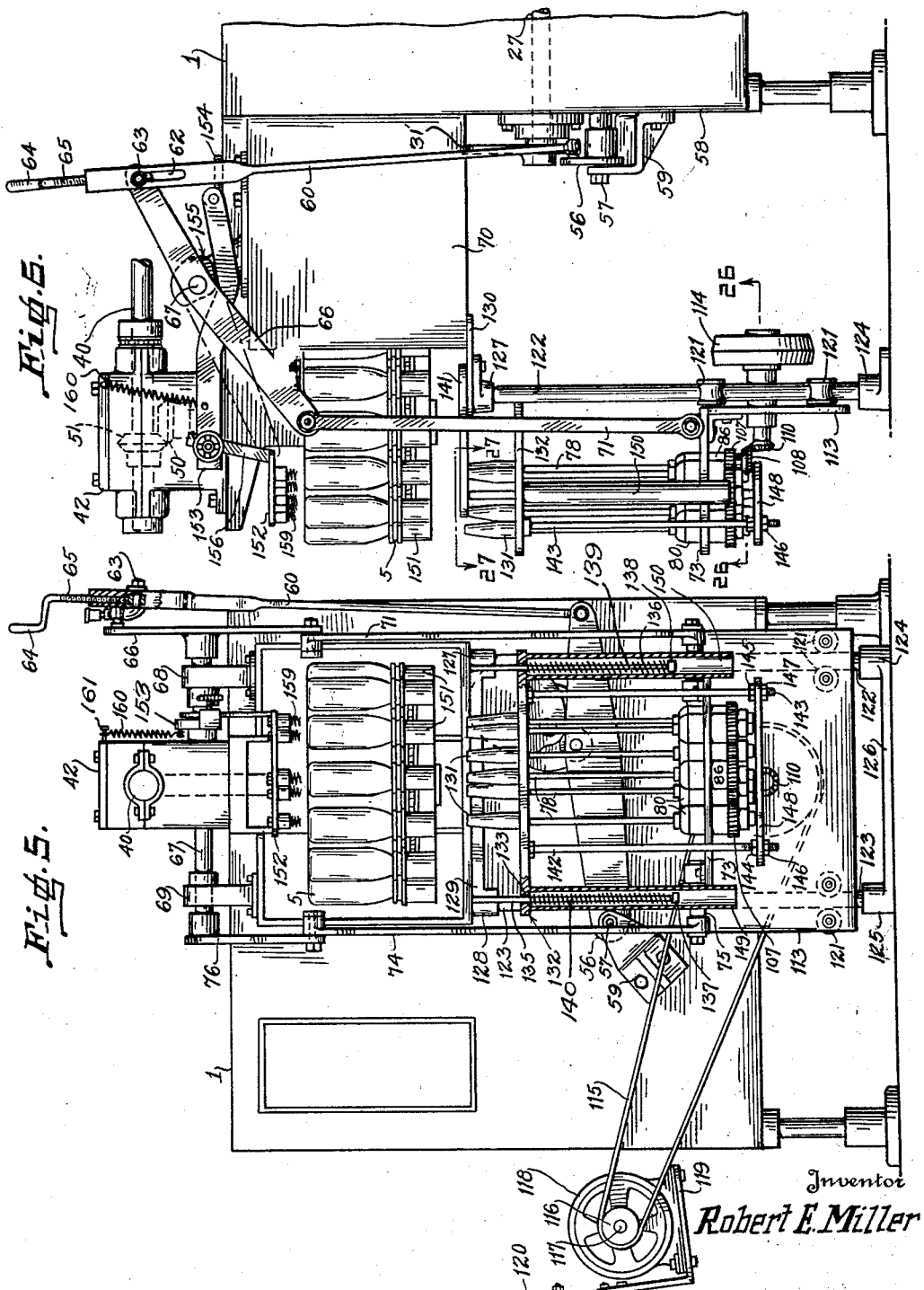

Sept. 13, 1932.  R. E. MILLER  1,877,682
AUTOMATIC BOTTLE WASHING AND BRUSHING MACHINE
Filed April 18, 1929    9 Sheets-Sheet 5
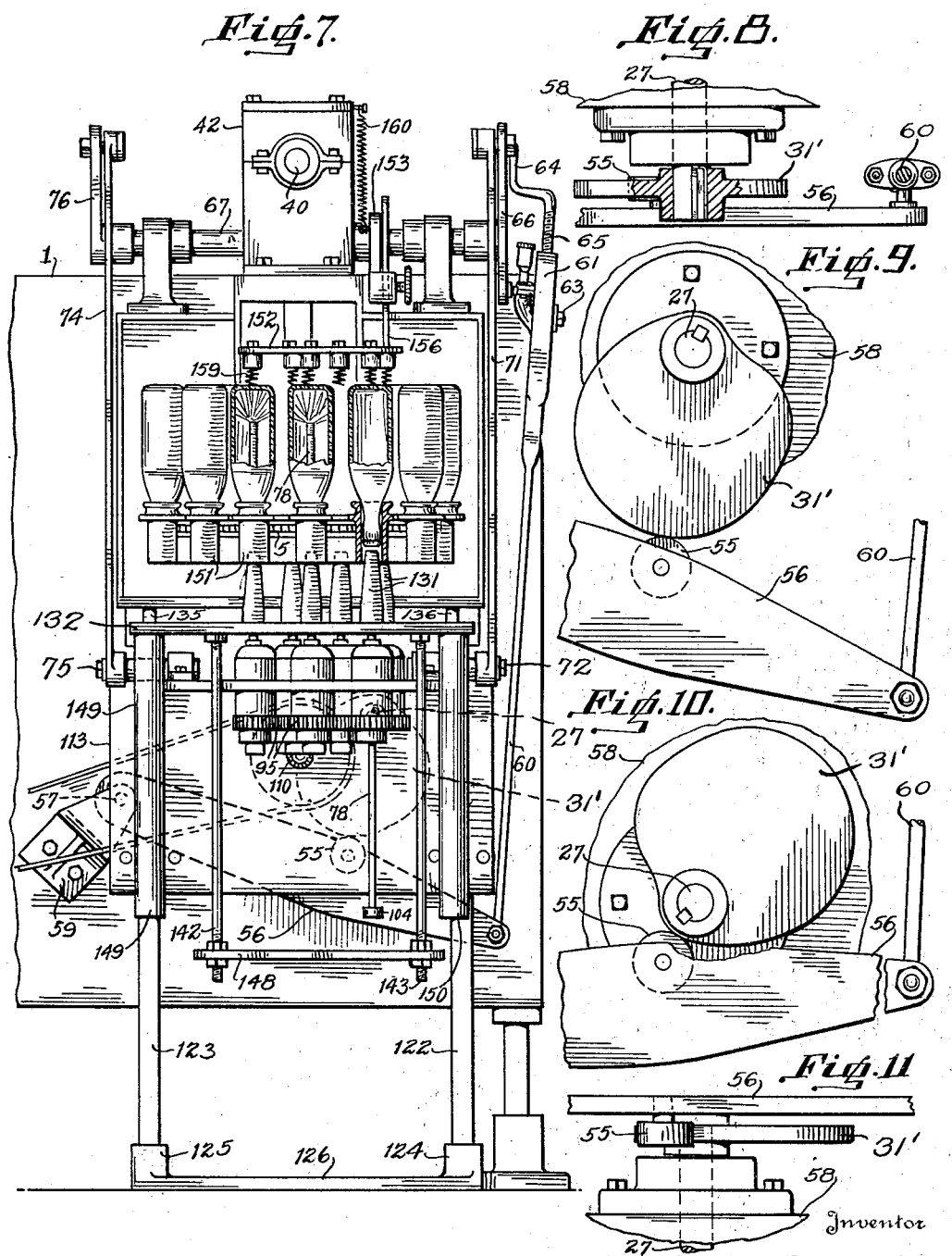
Inventor
Robert E. Miller
By Mason Fenwick & Lawrence
Attorneys Sept. 13, 1932. R. E. MILLER 1,877,682
AUTOMATIC BOTTLE WASHING AND BRUSHING MACHINE
Filed April 18, 1929 9 Sheets-Sheet 6
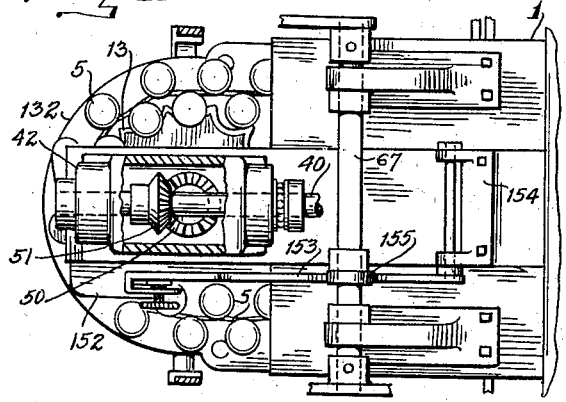
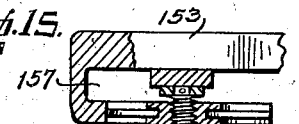
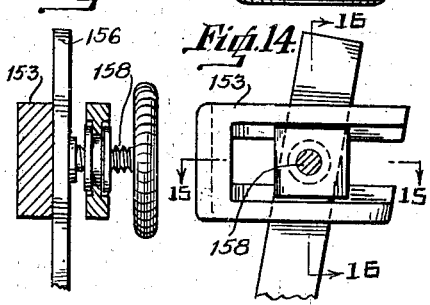
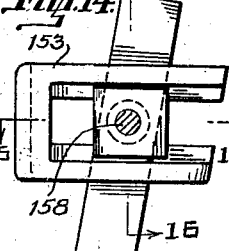
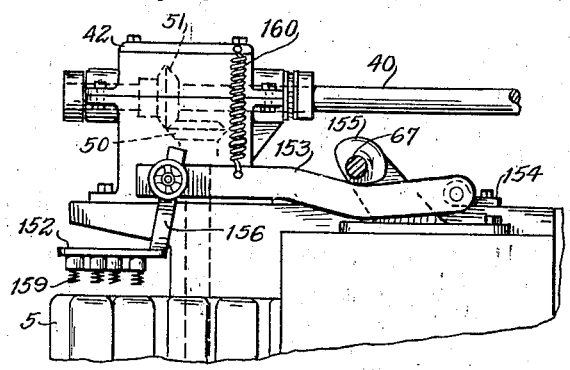
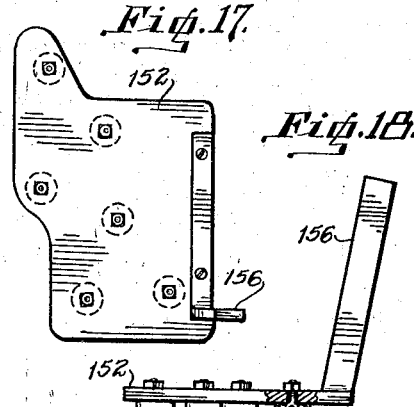
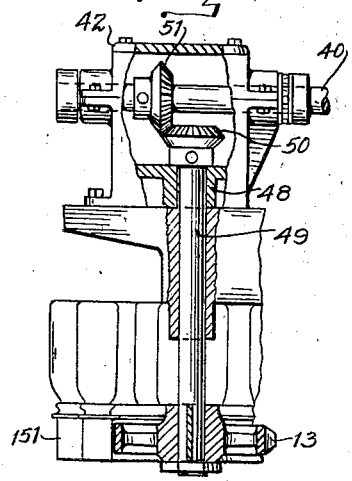
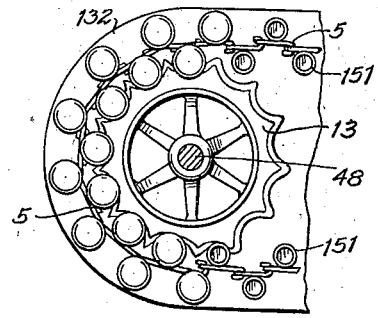
Inventor
Robert E. Miller
By Mason Fenwick Lawrence
Attorneys

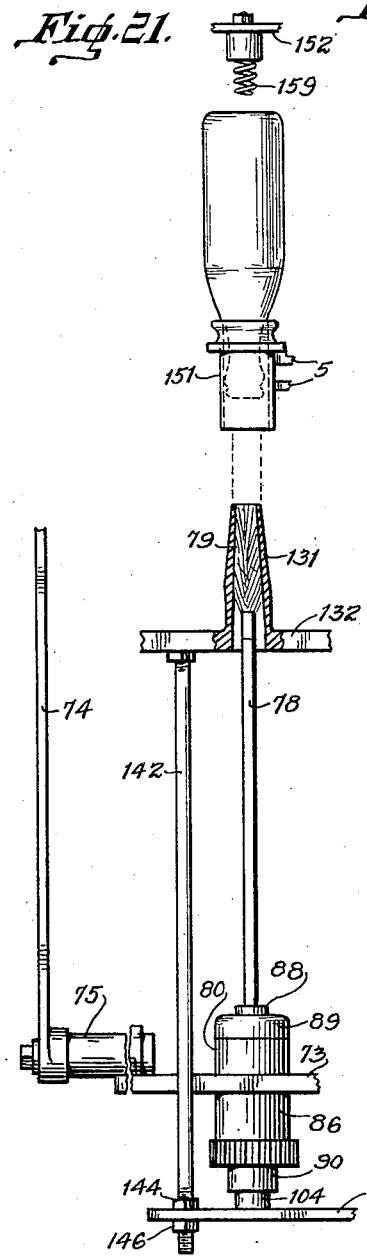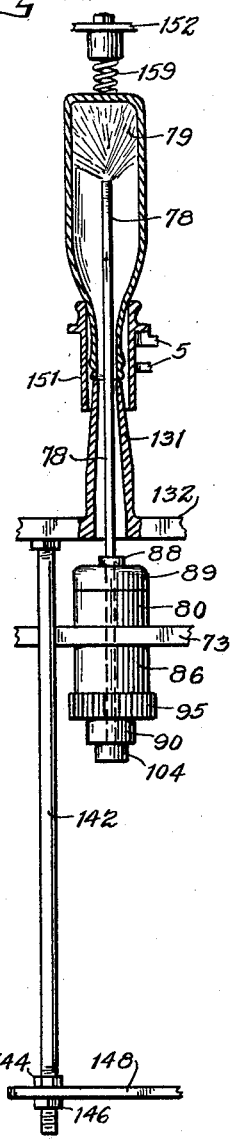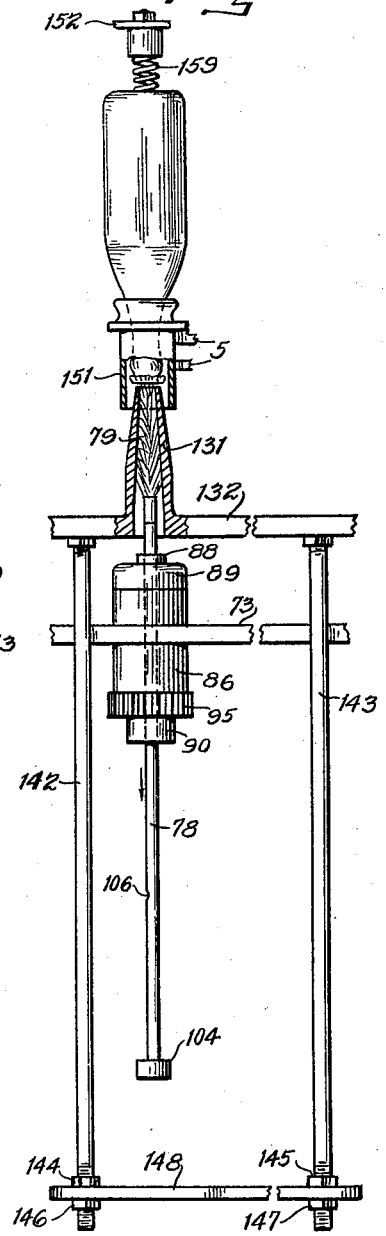

Sept. 13, 1932.   R. E. MILLER   1,877,682
AUTOMATIC BOTTLE WASHING AND BRUSHING MACHINE
Filed April 18, 1929   9 Sheets-Sheet 8
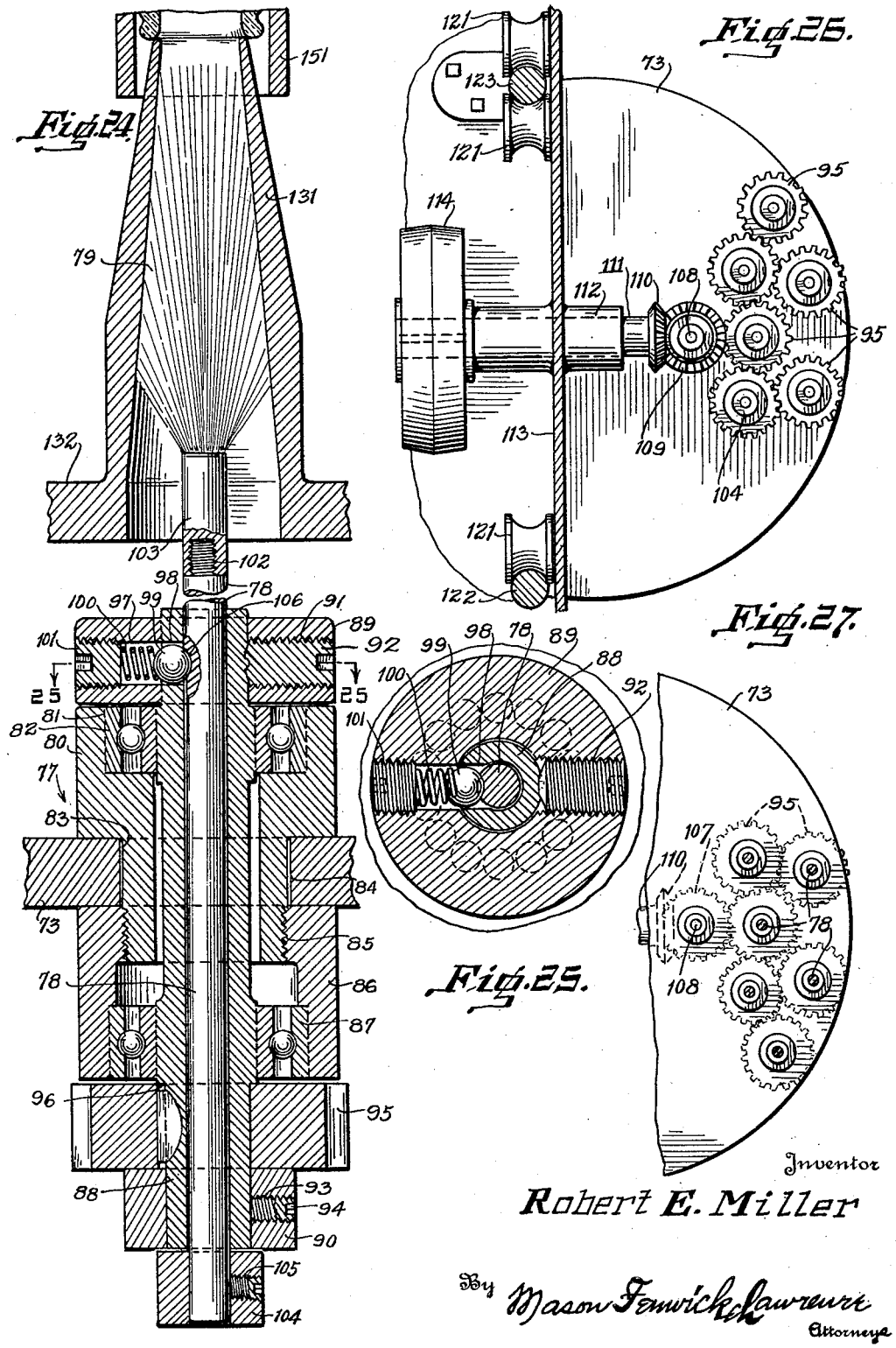
Inventor
Robert E. Miller
By Mason Fenwick & Lawrence
Attorneys Sept. 13, 1932.  R. E. MILLER  1,877,682
AUTOMATIC BOTTLE WASHING AND BRUSHING MACHINE
Filed April 18, 1929    9 Sheets-Sheet 9
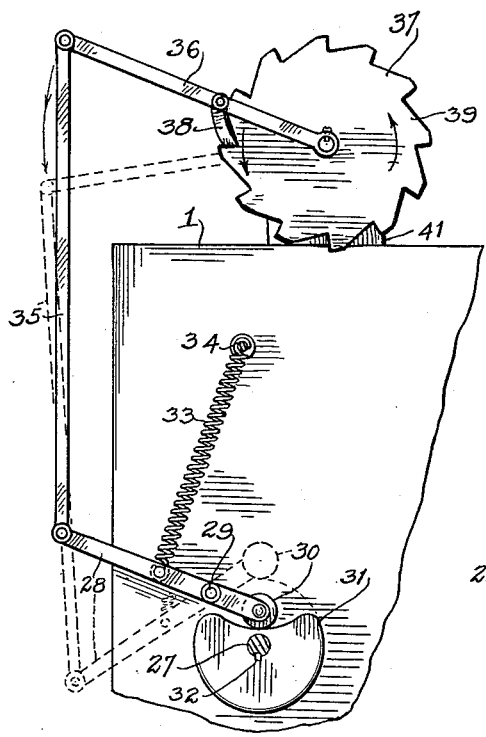
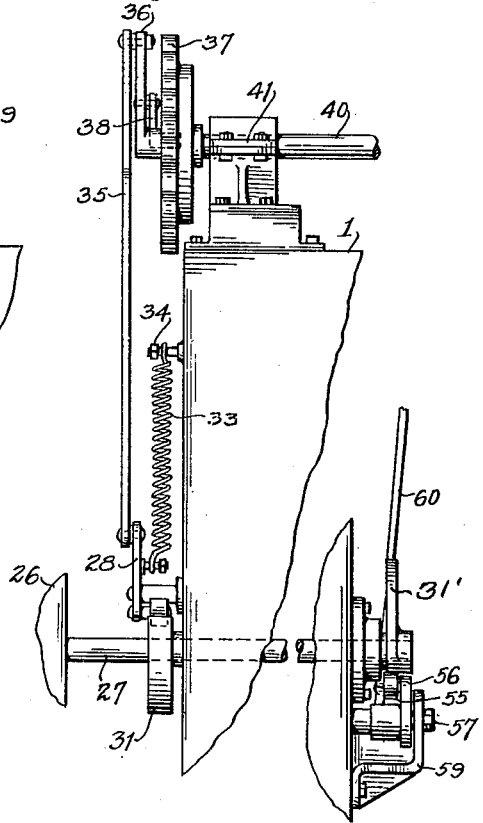
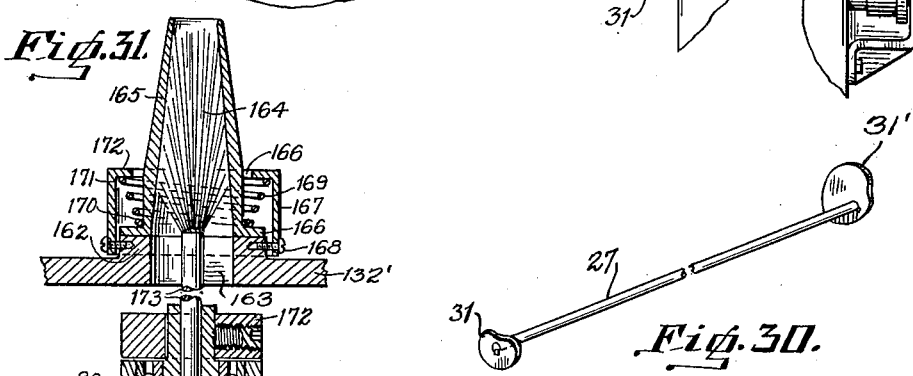
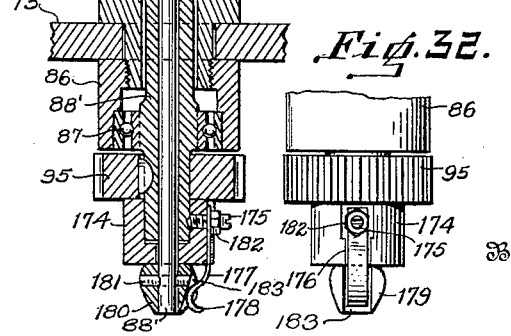
Inventor
Robert E. Miller
By Mason Fenwick & Lawrence
Attorneys Patented Sept. 13, 1932

1,877,682

UNITED STATES PATENT OFFICE

ROBERT EUGENE MILLER, OF BAINBRIDGE, GEORGIA

AUTOMATIC BOTTLE WASHING AND BRUSHING MACHINE

Application filed April 18, 1929. Serial No. 356,119.

The invention forming the subject matter of this application is a machine for automatically washing and brushing bottles; and embodying a number of safety devices adapted to prevent damage to the machine, or stoppage thereof, when subjected to conditions which formerly necessitated stopping the machine for repair, or removal of obstructions.

The main object of the invention is to provide a machine of the endless bottle-carrier type with mechanism for brushing the bottles in addition to the mechanism heretofore employed for washing them.

In this horizontal type of machine, the bottles are inserted in cups connected to links of an endless sprocket chain; and in these cups the necks of the bottles extend downwardly for about half the depth of the cups, and while thus supported are moved horizontally through a washing chamber provided with fountain wheels which spray the inside of the bottles with a caustic solution. It frequently happens that the washing operation will not remove all the dirt or other obstructions which may cling to the inside walls of the bottles, and it therefore becomes necessary to brush or scrape these inside walls in order to insure proper cleansing thereof. Obviously where the bottles are brushed to remove obstructions, the feed of the endless bottle-carrier must be made intermittent, and the carrier must be stopped in exact position to accommodate the brushes positioned to be inserted into the bottle and rotate therein.

Another object of the invention, therefore, is to provide a machine of this type with mechanism to stop the endless bottle-carrier at predetermined intervals, during each of which the brushes must be inserted into and removed from the bottles.

A further object of the invention is to provide each of the brushes with a protecting ferrule to cover it while out of brushing contact with a bottle, and which is so shaped and located as to contact with the top of the bottle neck and to guide the brush into the interior of a bottle without coming in contact with the said top. This feature of having the ferrule contact with the top of the bottle neck to guide the brush from the ferrule into the bottle without touching the said top is of great importance, because in systems in which the bottles are held neck down in the endless carrier, the whole top of the bottle neck is exposed and is frequently chipped; and these chipped tops coming in contact with the rapidly rotating brushes cut and destroy the brushes. It is to avoid this rapid destruction of brushes by chipped bottle necks that the present guiding ferrule construction is particularly provided.

A further object of the invention is to provide the brushing mechanism of this machine, and machines of a similar type, with means to permit a brush carrying spindle to yield axially whenever the brush contacts in the neck thereof, and to return into proper position for brushing another bottle at the next succeeding intermittent step of the bottle carrier.

Another object of the invention is to provide a novel mount for driving motors adapted to rotate the operating mechanism of the brushes used in machines of this character, whereby the weight of the motor itself operates as an automatic belt tightener to permit the train of mechanism to be raised and lowered during the operation thereof.

Other objects of the invention will appear as the detailed description thereof proceeds.

In the drawings:

Figure 1 is a top plan view of the complete bottle washing and brushing machine, with parts broken away and omitted to disclose the arrangement of the endless conveyer in the machine;

Figure 2 is a side elevation of the machine shown in Figure 1;

Figure 3 is a fragmentary top plan view of part of the machine illustrating the driving mechanism for imparting intermittent movement to the endless bottle-carrier;

Figure 5 is an end elevation of the bottle brushing mechanism, with the parts thereof shown in relative position occupied during the movement of the endless bottle carrier and while the brushes are in inoperative position;

Figure 6 is a side elevation of the mechanism with the parts in the same position as shown in Figure 5;

Figure 7 is an end elevation of the brushing mechanism showing the endless bottle-carrier in position of rest, and with the brush enclosing ferrules inserted into the bottle carrying cups;

Figure 8 is a fragmentary sectional plan view of cam mechanism for controlling the operation of the brushes;

Figure 9 is a fragmentary elevation, on an enlarged scale, of the cam mechanism shown in Figure 8;

Figure 10 is a fragmentary elevation showing the said cam mechanism in a different position from that shown in Figure 9;

Figure 11 is a fragmentary plan view of the mechanism in the position shown in Figure 10;

Figure 12 is a top plan view of the bottle brushing assembly with a part of the casing thereof broken away to illustrate the driving means therefor;

Figure 13 is a fragmentary side elevation of part of the mechanism shown in Figure 12;

Figure 14 is a fragmentary side elevation of adjusting mechanism;

Figure 15 is a horizontal section taken on the line 15—15 of Figure 14;

Figure 16 is a vertical transverse section taken on the line 16—16 of Figure 14;

Figure 17 is a top plan view of a plate adapted to be adjusted toward and from the bottom of bottles in order to lock the latter yieldingly in position in the bottle-carrier during the brushing thereof;

Figure 18 is a side elevation of the plate shown in Figure 17;

Figure 19 is a fragmentary sectional elevation of the drive shafting for the bottle brushing parts of this apparatus;

Figure 20 is a top plan view of a drive wheel for moving the endless bottle-carrier;

Figure 21 is an elevation of parts of a bottle brushing element shown in the position which these parts occupy immediately before or after a brushing operation;

Figure 22 is a sectional elevation of the same parts shown with a brush in operation inside a bottle;

Figure 23 is a sectional elevation similar to Figure 22 but illustrating the brush spindle moved out of operative position by contact of the brush itself with a cap or other obstruction which prevents the brush from entering the bottle;

Figure 24 is a vertical section of one of the brushing elments shown in position immediately prior to the entrance of a brush into a bottle neck;

Figure 25 is a horizontal section taken on the line 25—25 of Figure 24;

Figure 26 is a horizontal section, on an enlarged scale, taken on the line 26—26 of Figure 6;

Figure 27 is a horizontal section taken on the line 27—27 of Figure 6;

Figure 28 is a fragmentary elevation of the drive mechanism which imparts intermittent rotation to the endless bottle-carrier driving mechanism;

Figure 29 is a side elevation of the mechanism shown in Figure 28;

Figure 30 is a perspective view of a cam shaft which controls the timed operation of the movements of the endless carrier and the brush rotating mechanism;

Figure 31 is a transverse vertical section through a modified and preferred form of brush operating mechanism; and Figure 32 is a broken side elevation of the lower part of the mechanism shown in Figure 31.

Figure 4:
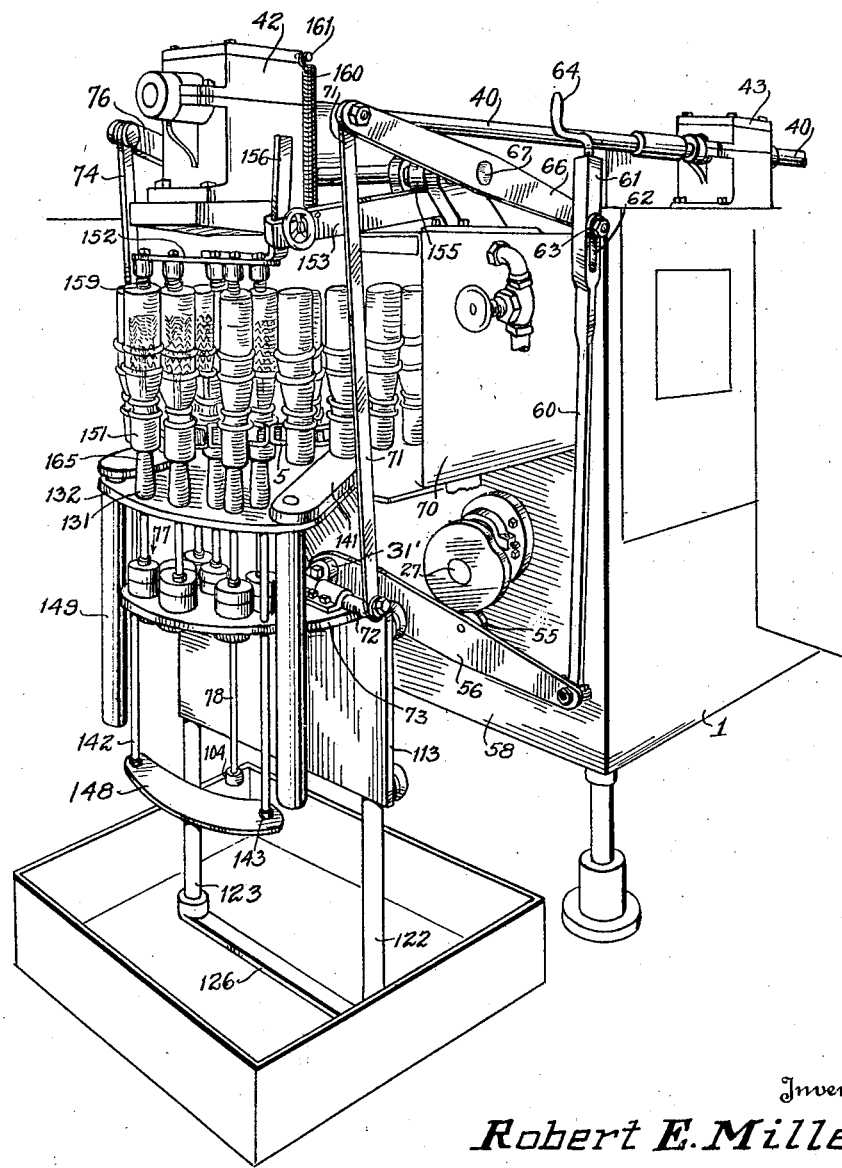
Figure 4 is a perspective view of the bottle brushing mechanism of this apparatus.

Referring to the drawings: The entire assembly is shown in Figures 1 and 2, and comprises a washing tank 1 supported by standards 2 and 3 on the base or floor 4. At a suitable height above the floor a bottle carrier 5 of the endless sprocket chain type is mounted to move horizontally into and out of the washing tank 1. The carrier has a part thereof movable, in the direction indicated by the arrow A, horizontally outside of and lengthwise of the tank 1, and extending around a sprocket wheel 6 at one end of the tank to move around said wheel 6 into a conduit 7 leading into the washing tank 1.

In the tank 1 the sprocket chain carrier 5 extends around the sprocket spray wheels 8, 9, 10 and 11; and passes out from the wheel 11 through a conduit 12 into mesh with a sprocket drive wheel 13 which forms part of the bottle brushing mechanism hereinafter described.

From the sprocket wheel 13 the bottle carrier chain 5 enters the conduit 14 and extends into the tank 1 to mesh with a fountain spray wheel 15, whence it is led out through a conduit 16 to a final-rinse spray wheel 17, around which it extends and is led out of the rinsing tank 18 through an outside shower 19 to the outside of the tank, where the cleansed bottles may be removed or automatically fed as desired to bottling machines.

The endless chain conveyer is driven by a motor 20 through suitable reducing gearing and ratchet mechanism for causing the endless conveyer to stop at predetermined intervals. The rotor 21 of the motor 20 is provided with a pulley 22; and a belt 23 connects this pulley 22 to a large pulley 24 suitably secured on a shaft 25 which extends from a box 26 containing suitable reducing gearing. The pulley 24 is made a great deal larger than the pulley 22 in order to reduce the rate of rotation of the motor shaft 21 as applied to the elements for moving the conveyer chain 5. At right angles to the shaft 25 a drive shaft 27 extends toward and through the tank 1 with the outer end thereof provided with mechanism, described hereafter, for raising the brushes of the machine into brushing contact with the inside of bottles when the latter are properly positioned and at rest after the preliminary washing thereof.

The bottle carrier 5 is intermittently moved by means of a ratchet linkage mounted at the end of the tank 1 adjacent the reducing gear box. This linkage is clearly shown in Figures 28 and 29 and comprises a lever 28 pivotally mounted to rotate on tank 1 about a pivot 29. One end of the lever 28 has an anti-friction roller 30 mounted thereon and adapted to ride over the periphery of a cam 31 fixedly secured by key 32 to the shaft 27. The lever 28 has one of its arms connected to a spring 33, which in turn, has one of its ends secured by a bolt 34 to the end wall of tank 1, in order to maintain the roller 30 in contact with the periphery of the cam throughout the rotation thereof.

The end of the lever 28 opposite the roller 30 is pivotally connected to one end of a rod 35; and this rod 35 has its other end pivotally connected to a link 36 pivotally mounted on a ratchet wheel 37 at the center thereof. The link 36 is provided intermediate its ends with a pawl 38 adapted to ride over the teeth 39 on the ratchet wheel 37 whenever the outer end of the link 36 is raised by means of the rod 35, and adapted to contact with one of said teeth in order to impart rotation to the ratchet wheel 37 whenever the rod 35 is lowered to the position shown by dotted lines in Figure 28.

The ratchet wheel 37 is suitably keyed on, or otherwise fixed, to a shaft 40, (see Figures 3 and 29) one end of which is journaled in the bearing 41 fixed on one end of the tank 1. The shaft 40 extends lengthwise over the top of tank 1 and projects beyond the end of tank 1 opposite the bearing 41 into a journal box 42 enclosing gearing for driving the end of the carrier chain 5 at a point immediately over the brush operating mechanism.

Intermediate the bearing 41 and the bearing 42 there is mounted on top of the tank 1 a gear box 43 which not only forms an intermediate journal bearing for the shaft 40, but also serves to enclose gearing for driving one of the sprocket fountain spray wheels. As shown in Figures 2 and 3 the shaft 40 is provided with a bevel gear 44 in mesh with a second bevel gear 45 fixed to the end of a shaft 46 journaled in a bearing 47 within the gear box 43.

The shaft 46 extends through the top of the tank 1 perpendicularly thereto and has fixedly secured thereto the fountain spray wheel 9, which not only serves for spraying the inside of the bottles positioned on the conveyor carrier chain 5, but also serves to drive the chain.

The gear box 42 encloses the journal bearing 48 in which is journaled the vertical shaft 49 having a bevel gear 50 fixed to the upper end thereof and in mesh with a bevel gear 51 secured to the shaft 40. The vertical shaft 49 extends downwardly and has fixed to the end thereof the sprocket wheel 13 for driving the sprocket chain bottle carrier 5.

As just described, it will be evident that the shaft 40 imparts its rotation through the vertical shafts 46 and 49 to the sprocket wheels 9 and 13. The sprocket wheel 10 is rotatably mounted between the ends of carrier plate 52 having one end thereof connected to a pivot 53 mounted on the bottom of the tank 1. A spring 54 has one of its ends fixed to the bottom of the tank 1 and has its other end fixed to the plate 52 intermediate the ends thereof and serves to swing the plate 52 in such manner as to maintain the carrier 5 under tension between the driving sprockets 9 and 13, and to hold it properly positioned over the bushes rotatably mounted below the wheel 13 when the chain is at rest.

The specific details of the bottle carrier 5 and of the fountain spray wheel constitute no part of the present invention, as they are well know in the art, and are not claimed in this application. However, the particular arrangement of the brushing mechanism outside of the washing tank 1 to provide for introduction of the brushed bottle into the tank again for a final cleansing and sterilizing operation is considered a very important part of the present invention, since the bottles cannot be considered as properly cleaned after brushing thereof, unless the dirt and other matter loosened by the brush and deposited by the brush is removed.

It is obvious that the brushes must be rotated and moved upwardly and downwardly into and out of the bottles, only when the latter are at rest. It is, therefore, necessary to drive the shaft 40 intermittently and in timed relation with the rotation of the shaft 27 in order that the brushes may be moved upwardly and downwardly only when the shaft 40 is at rest. To effect the intermittent rotation of the shaft 40, the shaft 27 has keyed thereon the cam 31 on the end of the tank near the driving motor 20, which cam 31 is shaped so as to give a rest period of a little more than 180° to the rotation of the shaft 40 through the linkage and pawl and ratchet mechanism previously described. At the other end of shaft 27, a cam 31′ is fixed in order to control the raising and lowering of the brushes during the period of rest of the shaft 40.

The cam 31′ is located at the bottle brushing end of the tank 1, and has its periphery in contact with the small roller 55, mounted intermediate the ends of a lever 56 which has one of said ends connected by a pivot 57 to the end wall 58 of the tank 1 (see Figure 4), a bracket 59 being secured on said end wall to form additional support for the pivot 57.

A link 60 has its lower end pivotally connected to the free end of the lever 56 and the upper end of this link 60 is provided with a box-like extension 61 provided with a slot 62 in which a pivot nut 63 is adapted to be slidably adjusted. A crank handle 64 has one branch 65 thereof threaded into the upper end of the extension 61, and has the lower end of this branch swiveled in the nut 63 in order to provide for the adjustment of this nut into any desired position with respect to the slot 62.

A lever 66 is fixed between its ends to a shaft 67 which is journaled in bearings 68 and 69 mounted on the top of the casing 70 in which the conduits 12 and 14 are formed. The lever 66 has one of its ends pivoted to the nut 63, and has its other end pivoted to a second link 71, which, at its lower end is pivotally connected to a pivot pin 72 secured on the gear supporting plate 73.

A link 74 identical in length with the link 71 and arranged on the opposite side of the plate 73, has its lower end pivotally connected to a pivot pin 75, which is also pivotally secured to the gear-supporting plate 73. The upper end of the link 74 is pivotally connected to a lever arm 76 which has its other end fixedly secured to the end of the shaft 67, remote from the lever 66. The arm 76 terminates at the shaft 67 and is moved simultaneously by shaft 67, with the movements of the arm of lever 66 which is connected to the link 71.

Gear-supporting plate 73 has secured thereto a plurality of casings 77, in each of which is slidably mounted a spindle 78 carrying a brush 79 at the upper end thereof. Each of these casings 77 includes a cylindrical member 80 provided with a counter-bore 81 (see Figure 24) adapted to receive a ball-bearing 82. The member 80 is turned down to form a reduced extension 83, adapted to fit snugly in an aperture 84, formed in the plate 73. The lower end of the extension 83 is threaded to receive the internal screw threads 85 of a second cylindrical member 86 which is also counter-bored to receive a ball-bearing 87.

A sleeve 88 is mounted to rotate in the members 80 and 86 by means of the ball-bearings 82 and 87; and this sleeve 88 is prevented from longitudinal movements in the members 80 and 86 by a pair of locking sleeves 89 and 90. The sleeve 89 is provided with an internally threaded radial bore 91 in which is mounted a set screw 92, adapted to be screwed into contact with the sleeve 88 to prevent downward movement of the sleeve 88 in the members 80 and 86. The sleeve 90 is also provided with a radial bore 93 screw threaded to receive the set screw 94 adapted to be screwed into contact with the lower end of the sleeve 88. Between the sleeve 90 and the lower end of the member 86, a gear 95 is keyed onto the sleeve 88 and is held against the shoulder 96 formed on the sleeve 88 by means of the locking sleeve 90.

The sleeves 89 and 90, therefore, prevent axial movement of the sleeve 88 in the members 80 and 86, but permit the free rotation of said sleeve 88 in the said members. The upper sleeve 89 is provided with a radial counter-bore 97 which is adapted to register with an aperture 98 formed near the upper end of the sleeve 88. The aperture 98 has a ball 99 mounted therein, and this ball is held by a spring 100 in contact with the spindle 78 by means of a set-screw 101 which screws into the outer end of the counter-bore 97 and forms an abutment for the outer end of the spring 100.

The brush spindle 78 is slidable lengthwise in the sleeve 88 and is provided at its upper end with a screw threaded portion 102, adapted to be screwed into the end of a shank 103 in which the bristles of the brush 79 are secured. The lower end of the spindle 78 is provided with a locking sleeve 104 having a radial bore therein adapted to receive a set screw 105 for locking the sleeve 104 in any desired position of adjustment on the spindle 78.

Normally, the spindle 78 is positioned in the sleeve 88 with its locking sleeve 104 substantially in contact with the lower end of sleeve 88; and to keep the spindle in this normal position, it is provided with a recess 106 adapted to form a seat for the ball 99. This construction is provided so that if the brush 79 should come in contact with a cap or other obstructions in the neck of a bottle the ball 99 will yield sufficiently to permit the spindle to slide downwardly in the sleeve 88, and thereby avoid breaking of the spindle or some other part of the apparatus.

As all the spindle supporting casings are identical in construction, the description of the one shown in Figures 24 and 25 applies to all of them. As shown particularly in Figures 26 and 27, the gears 95 of all the spindles are connected for rotation by a gear 107 which is mounted on a stub shaft 108 on the supporting plate 73. The gear 107 is rotated by means of a bevel gear 109 mounted on said stub shaft, and in mesh with the bevel gear 110 fixed on the end of a shaft 111 which is journaled in a bearing 112 which extends through a wall 113 on the back of plate 73.

The shaft 111 has a pulley 114 fixed thereto, and this pulley is driven by means of a belt 115 (see Figure 5) extending around the pulley 114 and a pulley 116 secured to the rotor 117 of a motor 118, which is mounted on an angular bracket 119, hingedly connected to a fixed part 120. As will be shown later on, the brush spindles and the plate 73, which carries the gearing for rotating them, are mounted for upward and downward movement in the machine, and the hinged support for the motor 118 is essential to provide for this movement of the gearing and its support. This hinged support for the motor also performs another very important function, as it provides a gravity operated automatic means for maintaining the belt 115 at substantially a constant tension throughout all movement of the brushes and the gearing which rotates them.

The wall 113 which is carried by the gear-supporting plate 73 has the back thereof provided with a plurality of anti-friction rollers 121 arranged in pairs to embrace and contact with supporting standards 122 and 123, the lower ends of which are seated in sockets 124 and 125 formed in a base plate 126. The upper ends of the standards 122 and 123 are secured in sockets 127 and 128 formed on the ends of a plate 129 fixed to the bottom of the casing 70 by a bracket 130 (see Figure 6).

Each of the brushes 79 is normally enclosed in a ferrule 131; and these ferrules, corresponding in number to the number of brushes employed, are formed integral with, or otherwise mounted on a ferrule supporting plate 132. The plate 132 is provided at its opposite ends with apertures 133 and 134 adapted to receive slidably rods 135 and 136, respectively, which are provided at their lower ends with nuts 137 and 138 to form abutments for compression coil springs 139 and 140. The upper ends of the springs 139 and 140 abut against the lower face of the plate 132 providing a yielding support for same relative to the rods 135 and 136, the upper ends of which are fixedly secured to a bracket 141 extending from the bracket 130 which is fixedly secured to the bottom of casing 70.

A pair of rods 142 and 143 are fixed to the bottom of the ferrule supporting plate 132 and are threaded at their lower ends to receive nuts 144 and 145 which cooperate with lock nuts 146 and 147 to secure a plate 148 in adjusted position on the rods 142 and 143. The plate 148 is adjusted in such position on the rods 142 and 143 that it forms a support on which the locking sleeves 104 of the spindles 78 rest when the brushes are in their lowest and inoperative position. The rods 135 and 136 and their springs 139 and 140 are enclosed in protecting casings 149 and 150, respectively.

The springs 139 and 140 are compression springs which normally tend to force the ferrule supporting plate 132 upwardly toward the carrier chain 5 to move the ferrules 131 into the cups 151 carried by the chain 5 and in position corresponding to the positions of the ferrules being raised by said spring. Normally, the ferrule plate 132 is held downwardly in inoperative position, as shown in Figures 5 and 6, by the weight of the gearing for operating the brush spindles resting upon the bottom or stop plate 148. As soon as the gear supporting plate 73 is moved upwardly by the links 71 and 74 the plate 148 is relieved from the weight of the gearing and brush spindles, and is thereby permitted to move upwardly with the ferrule plate 132 under pressure of the springs 139 and 140, until the tops of the ferrules contact with the necks of bottles carried by the cups 151.

In order to prevent the bottle from being forced out of the cups 151 by pressure of the ferrules on the necks thereof, a plate 152 is adjustably mounted above the bottoms of the bottles on the end of a lever 153 which has its other end pivotally mounted on a bracket 154 fixed on top of the tank 1. A cam 155 is secured on the shaft 67 immediately above the upper edge of the lever 153, and is adapted, when the shaft 67 is rotated, to contact with said upper edge and force the said lever with the plate 152 thereby downwardly toward the bottles immediately below said plate.

The plate 152 has an upturned bracket 156 suitably secured thereto or formed integral therewith; and this bracket is mounted to slide vertically in a slot 157 formed near the end of lever 153, a set screw 158 being provided to secure the bracket in adjusted position on said lever.

A plurality of coil springs 159 depend from and are suitably secured to the plate 152; and these springs are arranged on said plate so as to contact with the upturned bottoms of bottles presented immediately under the springs when the bottle carrier 5 is at rest.

As previously described herein, the brush ferrule plate 132 is supported by the springs 139 and 140, which, when released from the weight of the brush spindle gearing, force the ferrule plate upwardly to cause the top of the ferrules 131 to contact with the downturned tops of the bottle necks. At the same time the plate 152 is lowered to force the springs 159 onto the upturned bottoms of the same bottles. Thus, the bottles, when in position to be brushed, are held yieldingly between the springs 159 and the yieldingly supported ferrules 131, the cams and other mechanism being proportioned and arranged to effect this timed movement of the plates 132 and 152.

A spring 160 has one of its ends secured to the lever 153 near the bracket 156, and has its other end secured to a headed stud 161 projecting laterally from the upper part of journal box 42, in order to hold the lever 153 in constant contact with the cam 155 fixed to shaft 67.

The bracket 156 is made adjustable in the slot 157 in order to adapt the apparatus for cleansing bottles of different sizes, and to regulate the pressure of the springs 159 on the bottoms of the bottles.

As shown in the drawings the apparatus is designed to brush the insides of six bottles during each period of rest of the conveyor, and the cam 31 is designed to cause the bottle conveyor to come to rest immediately after the conveyor shall have moved through a distance corresponding to the length thereof occupied by six bottles. The cam 54 is shaped so that, as soon as the conveyor comes to rest, the brushes are raised from their lowest position into the bottles at rest above them and then return to their lowest position just before the conveyor starts moving again.

The carrier chain conveyors of this type of apparatus are usually built up of cast metal links and cups. It is quite likely, therefore, that the axes of these cups are not always identical in shape or exactly spaced apart. Where this condition exists the ferrules 131, rigidly fixed to the ferrule plate 132, are apt to have their axes not properly centered with the axes of the cups 151 and the bottles; and, may even be so far displaced as to cause breakage of the ferrules or the cups.

In order to eliminate all chance of breaking the cups or ferrules from this cause, the modification shown in Figs. 31 and 32 has been designed. In this form of the invention, a ferrule plate 132' has a series of cylindrical bosses 162 formed thereon concentrically with bores 163 to permit the passage through the plate 132' of the brushes 164.

Each ferrule 165 has its lower end provided with a flange 166 adapted to rest on the boss 162, and is tapered toward its upper end to adapt it for easy entrance into a cup 151 of the carrier 5. The upper end of each ferrule passes loosely through an aperture 166 in the upper end of a cylindrical cap 167, which has its lower end secured to the boss 162 by set screws 168.

A coil spring 169 of inverted frusto-conical shape is seated in cap 167 with its narrow end 170 against the flange 166, and with its wider upper end 171 abutting against a flange 172 which defines the boundary of the aperture 166.

The lower end of this spring fits snugly around the lower end of ferrule 165 in the corner between the body of the ferrule and its flange 166. The upper end of the spring fits snugly in the corner formed by the body of the cap 167 and its flange 172. This construction enables the ferrule to rock slightly on its boss 162 and to move laterally on said boss whenever the ferrule encounters a bottle supporting cup somewhat irregularly shaped or located on the carrier 5. At the same time the spring is strong enough to hold the ferrule against rotation by the brush when the latter is seated in its ferrule.

A slightly modified form of the brush spindle is shown in Figs. 31 and 32 from that shown in Figure 24. In the form shown in Figure 24, the ball 99 is in constant contact with the spindle 78, even when the latter is moved, by an obstruction on a bottle, so as to move its recess 106 away from the ball 99. This constant contact causes the brush spindle to rotate always against the obstruction. The modification shown in Figs. 31 and 32 is designed to overcome this objection.

In Figs. 31 and 32 the brush spindle supporting and operating structure is substantially the same as that shown in Figure 24, and the elements which are identical in the two structures are identified by the same reference numerals. In the form shown in Figure 31 the sleeve 172 is the same as sleeve 89 of Figure 24, except that the ball and spring mechanism of Figure 24 have been omitted and the spindle is formed without the ball receiving recess 106.

The sleeve 90 which holds the gear 95 positioned on the sleeve 88 of Figure 24 is replaced in Figs. 31 and 32 by a cap 174 secured on the sleeve 88' by a set screw 175. This cap 174 is provided with a recess 176 in which is seated a leaf spring 177 provided with a turned out end 178 adapted to contact with the inclined face 179 of a small ball sleeve 180 which is secured to the end of spindle 173 by a pin 181. The set screw 175 has a nut 182 threaded thereon to contact with the spring 177 and clamp the latter rigidly in its recess 176.

If the brush encounters a cap or other obstacle in the bottle neck, spindle 173 will slide downwardly through sleeve 88', spring 177 sliding over ball sleeve 180. In normal elevated position spring 177 will seat in a vertical slot 183 cut in ball sleeve 180 and thus transmit rotary motion to spindle 173.

What I claim is:

1. In a brushing machine, the combination with a frame, of an endless bottle carrying conveyor movable intermittently on said frame, means for intermittently moving said conveyor, a plate below said conveyor reciprocable on said frame vertically toward and from said conveyor, a plurality of brush supporting spindles, means for mounting said spindles to rotate and move axially on said plate, yielding means on said mounting means for holding said spindles in a predetermined position relative to said plate, a second plate supported yieldingly on said frame and adapted to contact with the ends of said spindles to move each of them into said predetermined position in the event that any of them have been moved out of said position, and means for reciprocating the first named plate toward and from said conveyor.

2. In a bottle brushing machine, the combination with a frame and an endless bottle carrier movable therethrough, of a plate reciprocable toward and from said carrier, a casing perpendicular to said plate, a sleeve rotatable in said casing, a spindle slidably mounted in said sleeve, yielding means for frictionally holding said spindle against rotary or axial movement in said sleeve, and means below said plate to move said spindle axially in said casing into holding contact therewith after the spindle has been moved from said frictionally held position.

3. In a bottle brushing machine, a plate, a brush spindle slidably and rotatably mounted on said plate, yielding means for rotating said spindle and holding said spindle against axial movement through said plate, means for rotating said yielding means, and means for moving said spindle into holding position with said holding means after displacement from such position by axial movement.

4. In a bottle brushing machine, the combination with a frame, of an endless bottle carrying conveyor movable through said frame, a plate reciprocable on said frame toward and from said carrier, a plurality of brush spindles rotatably and slidably mounted on said plate, means holding the brush spindles yieldingly in normal operative position to permit the brush spindles to slide axially out of normal position when the brush encounters a cap or other obstacle, a second plate yieldingly mounted on said frame and located between the first named plate and said conveyor, a plurality of ferrules movably mounted on the second plate, brushes on the end of each spindle projecting into and normally enclosed by said ferrules, means for moving the first named plate toward and from said conveyor, yielding means for moving said ferrule supporting plate toward said conveyor in advance of the first named plate, and means carried by the ferrule carrying plate in the path of movement of the ends of said spindles for moving the second plate with the ferrules thereon away from said conveyor on the return movement of the first named plate therefrom and simultaneously returning to normal position such spindles as may have been moved out of normal position.

5. In a bottle washing machine a washing tank, a drive shaft extending lengthwise of the tank, a second drive shaft parallel with the tank and above the first, means at one end of the tank associating said shafts to convert the continuous rotation of the first shaft into intermittent rotation of the second, brushing mechanism at the opposite end of the tank, means carried by the first shaft to periodically raise and lower the brushing mechanism, vertically mounted shafts in the tank and above the brushing mechanism, drive gears on said vertical shafts, an endless conveyor disposed in one horizontal plane and extending around said drive gears and driving connections between the second shaft mentioned and said vertically mounted shafts.

6. In a bottle washing machine having a horizontally moving bottle conveyor, a frame, a brushing device comprising a vertically reciprocable brush carrier reciprocable vertically on said frame, a brush rotatable and vertically slidable in said carrier, tension means for holding the brush in position for normal operation, a ferrule and a vertically reciprocable ferrule carrier resiliently supported by said frame and stop means carried by the ferrule carrier against which the brushes are adapted to abut after being moved from normal position to be returned to normal position.

7. In a bottle washing machine, a brushing device comprising a spindle having a brush on one end, a brush support having a through hole, a journal member having a reduced part passing through the hole in the brush support and having a bearing, a second journal part in alignment with said journal member and engaging the reduced part thereof and having a second bearing, a sleeve rotatably mounted in the bearings of said journal members, a driving gear secured to said sleeve, the brush spindle being axially slidable and rotatable in said sleeve, and yielding means coacting with said sleeve and brush spindle adapted to rotate the brush spindle only in one axial position with respect to the sleeve.

8. In a bottle washing machine, a brushing device comprising a spindle having a brush on one end and a detent on one side, a brush support having a through hole, a journal member having a reduced part passing through the hole in the brush support and having a bearing, a second journal part in alignment with said journal member and engaging the reduced part thereof and having a second bearing, a sleeve having a radial bore and rotatably mounted in the bearings of said journal members, a drive gear secured to said sleeve, the brush spindle being axially slidable and rotatable in said sleeve, and yielding means comprising a ball slidable in the radial bore of the sleeve and coacting with said sleeve and brush spindle detent, and spring means tending to force said ball against the brush spindle.

9. In a bottle washing machine a brush device comprising a spindle having a brush on one end, a ball secured to the brush spindle having a detent on one side, a brush support having a through hole, a journal member having a reduced part passing through the hole in the brush support and having a bearing, a second journal part in alignment with said journal member and engaging the reduced part thereof and having a second bearing, a sleeve rotatably enclosed in the bearings of said journal members, a driving gear secured to said sleeve, the brush spindle being axially slidably and rotatably mounted in said sleeve, and a spring mounted on the sleeve adapted to coact with the ball and the detent for said ball on the brush spindle.

In testimony whereof I affix my signature.

ROBERT EUGENE MILLER.